United States Patent [19]

Bailey et al.

[11] 4,353,092

[45] Oct. 5, 1982

[54] REAL TIME HISTOGRAM MODIFICATION SYSTEM

[75] Inventors: Peter K. Bailey, Uckfield; Leslie H. Guildford, Haywards Heath, both of England

[73] Assignee: U.S. Philips Corporation, New York, N.Y.

[21] Appl. No.: 135,969

[22] Filed: Mar. 31, 1980

[30] Foreign Application Priority Data

Mar. 29, 1979 [GB] United Kingdom ................ 7910951

[51] Int. Cl.³ .............................................. H04N 5/14
[52] U.S. Cl. .................................... 358/160; 358/166; 358/169
[58] Field of Search .................. 358/37, 166, 160, 169

[56] References Cited

U.S. PATENT DOCUMENTS 4,214,271  7/1980  Jones et al. ........................ 358/166
4,231,065  10/1980  Fitch et al. ........................ 358/166

Primary Examiner—Robert L. Richardson
Attorney, Agent, or Firm—Thomas A. Briody; William J. Streeter; Edward W. Goodman

[57] ABSTRACT

An iterative real time histogram modification system for use in image processing, such as image contrast enhancement of for example scenes, radiograms and thermograms.

In the described system input analogue video signals to be modified are digitized and applied to an encoding module including a code RAM which compresses the input grey levels into a lesser number of output grey levels in accordance with a recoding strategy applied to the code RAM. The recoding strategy is determined iteratively using a predetermined scene adaptive operator. This is done by forming a histogram of the pixels in the respective output grey levels. Thereafter the count in each grey level is compared with a predetermined population figure for that grey level and if the difference between the count and population figure is outside an acceptable range, termed a window, then the recoding strategy to be used during the next frame of the input signals is altered so that the number of input grey levels compressed into the particular output grey level is adjusted appropriately.

The recoding strategy may be applied to a local area of the frame, which area is selected at will, or to the entire frame in which case the histogram is formed from a subset of all the pixels. The scene adaptive operators include histogram equalization, Gaussian distribution, hyperbolic and exponential. By using a suitably programmed microprocessor different scene adaptive operators may be selected at will and a "zoom" facility may be provided in which the size of the local area is varied and corresponding changes are made to the window and set of population figures.

14 Claims, 6 Drawing Figures

REAL TIME HISTOGRAM MODIFICATION SYSTEM

BACKGROUND OF THE INVENTION

The present invention relates to a real time histogram modification system for use in image processing, particularly image contrast enhancement.

In the prior art it is known to produce image contrast enhancement off-line using optical techniques and digital computers. In the case of using computers, input grey level information is operated on using various transformations or operators such as histogram equalization and histogram hyperbolization prior to the transformed information being supplied to a signal output. A histogram equalization technique is disclosed by R. Hummel, Image Enhancement by Histogram Transformation, Computer Graphics and Image Processing 6, 184–195 (1977) and a histogram hyperbolization technique is disclosed by Werner Frei, Image Enhancement by Histogram Hyperbolization, Computer Graphics and Image Processing 6, 286–294 (1977).

Two techniques for image enhancement in real time are disclosed by David J. Ketcham, Real Time Image Enhancement Techniques /SPIE/OSA—Vol. 74 (1976). Image Processing and these techniques are described in greater detail in U.S. Pat. Nos. 3,983,320 and 3,996,421. One of these techniques concerns local area histogram equalization (LAHE) and the other concerns local area enhancement by adjusting video gain and brightness. The LAHE technique is suited for use in those situations where it is desired to eliminate contrast attenuation in image areas that represent a statistically small but important portion of a grey scale histogram. In this technique a histogram of the intensity values of an area of say 32×32 pixels is computed and a recoding strategy is determined on the basis of histogram equalization, this strategy then being applied to the central 4×4 pixels of the area under consideration. The area, which may be termed a window or keyhole, is moved by 4 pixels along the same line and the process is repeated with the new image enhanced 4×4 area being adjacent the first area. This process continues 4 pixels at a time along a line until no further horizontal movement is possible. The system then drops down 4 pixels and continues the process step by step horizontally. Ultimately, apart from a margin comprising a peripheral band of 14 pixels deep, the remainder of the picture has undergone local area histogram equalization. Although the technique is in itself satisfactory, the system is structurally complex and requires a great deal of circuitry, especially memories. In the gain/brightness technique (U.S. Pat. No. 3,996,421) a smaller sliding window of 8×8 pixels is taken and the intensity value of only one pixel is adjusted.

SUMMARY OF THE INVENTION

The object of the present invention is to provide a real time histogram modification system which requires less circuitry than in the prior art system and also can be adapted to use different recoding strategies.

According to the present invention there is provided a real time histogram modification system in which the recoding strategy of pixels in an input video signal is determined by processing iteratively the number of pixels in respective grey levels of output picture information using a predetermined scene adaptive operator.

By using an iterative technique for determining the recoding strategy, the structural embodiment of the system is simpler and cheaper compared with system proposed in U.S. Pat. No. 3,983,320. However the iterative technique has a disadvantage compared with the direct technique which forms a histogram of the input information, which histogram is then equalised, in that from start-up approximately 20 frames are required to modify the scene as desired and any changes are tracked within 1 to 5 frames whereas in the direct technique the desired modification of the scene and the tracking of changes is generally accomplished within 2 frames.

In the system in accordance with the present invention, the histogram modification may be applied to a pre-positionable local area, termed a keyhole, or to an entire frame. By using a pre-positionable keyhole image, contrast enhancement can be achieved within a selected area of an overall frame, thus the context in which the enhancement is taking place and the overall nature of the displayed image is not lost, this can be important in certain specialized environments. In the case of enhancing the entire frame, this may be done using a recoding strategy based on a subset of randomly, or pseudo-randomly, sampled pixels. By using such a technique the amount of circuitry required and time required to determine each new recoding strategy is reduced compared with using all the pixels in a frame being displayed.

An embodiment of the system may comprise a coding module in which pixels in the input signal to be modified are coded in accordance with a coding strategy determined by the distribution of the pixels in the output grey levels of the information to be displayed. In order to form a histogram of the pixels in the output grey levels, a count module is coupled to an output of the coding module. The recode strategy is determined using recode and control means which is coupled to the count module. Said means takes, in turn, the count in each grey level of the histogram formed in the count module, compares it with a predetermined theoretical population figure for that level, the population figure being determined by the scene adaptive operator being used, and if the difference between the count and the population figure is outside a predetermined range, hereinafter termed a window, produces a signal indicative of an appropriately adjustment to the number of input signal grey levels to be coded into the predetermined output grey level.

If desired, means may be provided for forming a plurality of different size windows thereby enabling a window size to be used which is not so small as to cause the system to hunt or so large that the final histogram will deviate widely from the ideal for that scene adaptive operator.

In the case of the first frame of the input video signal, the recoding strategy may be linear and therafter the second and subsequent frames are coded according to a strategy determined by the particular scene adaptive operator which may result in an equalized, Gaussian, hyperbolic or exponential histogram.

The recode and logic control means may comprise a suitably programmed microprocessor and a program memory. The provision of a microprocessor enables the system to be more flexible because the program memory may store a range of non-linear scene adaptive operators which can be applied at will. Thus by being able to apply different operators to a scene, it is possible to determine which operator provides the best image contrast enhancement. Further the use of a microprocessor enables a "zoom" facility to be provided so that the size of the keyhole can be varied at will together with area dependent variables such as the window size and the set of theoretical population levels.

If desired, a store may be provided for storing at least two sets of window values and the microprocessor may be adapted to select one of said sets on a time dependent basis. In so doing, the speed of convergence of the algorithm may be increased compared with using only one set of window values.

A pattern detecting means may be provided for modifying a histogram in a scene dependent manner thereby enabling various forms of image enhancement to be made, e.g. enhancing a double humped input histogram.

DESCRIPTION OF THE DRAWINGS

The present invention will now be described, by way of example, with reference to the accompanying drawings, wherein.

DESCRIPTION OF THE PREFERRED EMBODIMENTS

Before discussing details of the circuits a general discussion will be given of those factors which have been considered in determining the nature of the image enhancement being used.

The following description will disclose the application of a non-linear operator for example histogram equalization to real-time video signals on a frame-by-frame basis. It has been found that this operator can be used most conveniently by performing enhancement within a "keyhole" area, i.e. a rectilinear window within the frame, whose position and size can be electronically controlled. By using histogram equalization the picture elements within the keyhole are redistributed among the grey-levels available for display in such a manner that each level contains approximately the same number of pixels. This has the effect of improving the visibility of detail in large areas of low contrast within the original image.

Although the technique of histogram equalization will be described in detail, other histogram modifications, such as square law Gaussian, hyperbolization and exponentiation, may also be performed in real time, that is, at video signal rates.

The operation of histogram equalization may be looked upon as a rationalization of a sampled and quantized image such that there are approximately the same number of picture elements, i.e. "pixels", in each quantized level to be displayed. That is, the radiance transfer function of the system is modified such that an image is displayed whose grey-level histogram (first order probability density function), that is a hypothetical graph showing the number of pixels in each quantized level in a single picture, frame or keyhole as appropriate, is approximately rectangular. Since, in general, the histogram of a "linearly quantized" image will be non-rectangular, the operation of histogram equalization requires that the image or video signal be quantized using a non-linear and in our case, a scene adaptive quantizer or operator.

A reason to implement such an operator lies in the fact that very often images, especially those from IR and X-ray systems, have histograms that are strongly peaked, i.e., a large number of the total pixels are concentrated into a narrow range of grey levels. Under these circumstances, many of the contrast ratios that define edges are simply not displayable, even though they are present in the original signal. The histogram equalization operator expands grey level ranges where pixels are prevalent while compressing them where pixels are sparse, thereby improving the visibility of the edge detail within regions where the original histogram was peaked. It is, of course, also possible that small details which are represented by only a few pixels may be completely lost after histogram equalisation, their having been compressed into the same display grey level as their surroundings. However, the general effect is to improve the visibility of fine detail within the enhanced image.

Figure 1:
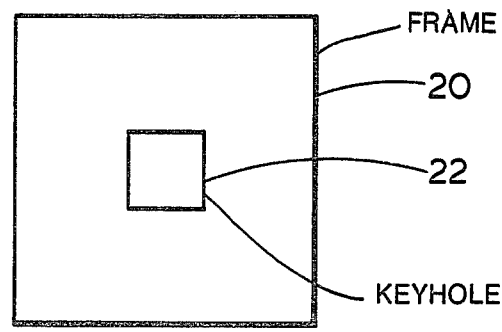
FIG. 1 illustrates diagrammatically a complete frame and a pre-positionable keyhole within the frame.

FIG. 1 shows diagrammatically a complete frame 20 which for convenience of description comprises 512×512 pixels and a keyhole 22 within the frame 20. The keyhole 22 is settable electronically anywhere over the area of the frame 20. The size of the keyhole 22 is chosen at will having regard to a number of factors which will be discussed later. Initially it will be assumed that the part of the image appearing in the keyhole 22 is to be enhanced while the remainder of the image corresponds to the original linear display. Such a form of display sets the context in which the enhancement is taking place and the overall nature of the displayed image is not lost.

The best size to choose for the keyhole 22 is a compromise between a number of conflicting requirements. The most important of these are:

1. The keyhole 22 should be larger than the objects that one is trying to recognise in the scene, otherwise the abrupt change of coding across an object breaks up its outline and the net effect can be worse than with no image enhancement at all.
2. The smaller the keyhole 22, the more specially adaptive the coding can be made for that local area, resulting in greater enhancement.

Other factors, such as storage for the histogram count must also be taken into account. It has been found that in the case of a 512×512 pixel picture, a 128×128 pixel keyhole represents a reasonable compromise.

In the present specification, iterative real-time histogram modification systems will be described for use with digitized video signals. The system which uses a "code RAM" as a dynamic look-up table to compress non-linearly the incoming video from, say $2^a$ levels to $2^b$ levels, where $b<a$, differs from other systems in two ways. Firstly, it only requires knowledge of the $2^b$ level output histogram for computation of the required non-linear transfer function. Since, typically, 8-bit input video would be compressed to 5-bits, this means that a reduction by a factor of up to 8 can be expected in the storage requirements for the histogram count. Secondly, provision is made for any type of modification scheme, e.g. histogram hyperbolization, equalization, and exponentiation, to be implemented, thereby greatly increasing the flexibility and usefulness of the operator.

Figure 2:
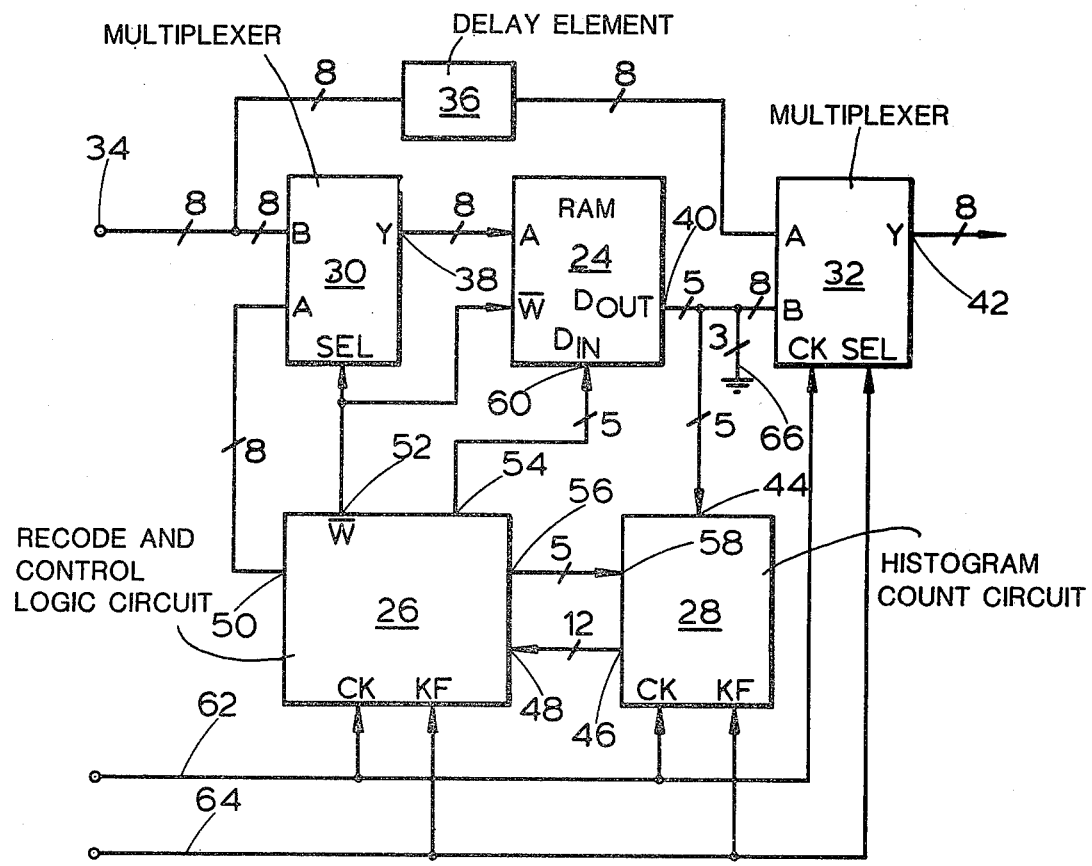
FIG. 2 is a block schematic diagram of an embodiment of a real-time iterative histogram modification system.

A block diagram of the system is shown in FIG. 2. The system is intended to apply corrections only within the keyhole 22 of the complete frame 20, whose position is delineated electronically by a "keyhole flag". This flag is true whenever the part of the raster currently being scanned falls within the keyhole area, which would typically comprise of between 1K and 16K pixels. Normally, the histogram would be counted within, and the correction only applied to, this keyhole area.

The schematic embodiment of the system shown in FIG. 2 comprises 3 major blocks, a 256×5 code RAM 24, a recode and control logic circuit 26 and a histogram count circuit 28. Also provided are two 8-bit multiplexers 30, 32 for signal steering. For convenience, the number of conductors in each connector or line will be indicated by the number appearing next to a short oblique line applied to each conductor or line. The digitised video signal at the input 34 is connected by 8-way conductors to the input B of the multiplexer 30 and, via a delay element 36, to the input A of the multiplexer 32. A Y output 38 of the multiplexer 30 is connected to an input A of the code RAM 24, a $D_{out}$ output 40 of which is connected to a B input of the multiplexer 32. An 8-bit output video signal is derived from the Y output 42 of the multiplexer 32. The $D_{out}$ output 40 of the code RAM 24 is also connected to a "video In" input 44 of the histogram count circuit 28. A "count out" output 46 of the circuit 28 is connected to a "count in" input 48 of the recode and control logic circuit 26. The circuit 26 has four outputs 50, 52, 54 and 56. The output 50 is for the recoded address and is connected to the input A of the multiplexer 30. The output 52 is for a "WRITE" signal which is connected to a select input SEL of the multiplexer 30 and to a $\overline{W}$ input of the code RAM 24, which is also supplied with recode data via the output 54 of the circuit 26 and a $D_{IN}$ input 60 of the code RAM. The output 56 is a level address output which is connected to a level address input 58 of the histogram count circuit 28. The system has a clock signal line 62 which is connected to clock inputs CK of the circuits 26, 28 and the multiplexer 32. A keyhole flag signal line 64 is connected to the "keyhole" inputs KF of the circuits 26 and 28 and to the SEL input of the multiplexer 32.

In operation when the keyhole flag signal is false, that is, a part of the frame 20 not including the keyhole 22, is being scanned line-by-line, the digitized video signal on the input 34 is transmitted unmodified via the delay element 36 to the input A of the multiplexer 32.

When the scan begins on a line including the keyhole 22 (FIG. 1), then the keyhole flag signal is true and the modification system is operative. The digitized input video signal from the input 34 is applied via the multiplexer 30 to the inputs A of the code RAM 24. This RAM 24, which acts as a look-up table, is used to compress the incoming video signal from 8 bits, that is 256 grey levels, to 5 bits that is 32 levels, according to the current encoding strategy determined by the recode and control logic circuit 26. In the case of the first scan of the frame, the encoding strategy may be linear, that is the first 8 input grey levels are coded as level 1, the second 8 as level 2 and so on until the final 8 are coded as level 32. The coded data at the output 40 is applied firstly to the input 44 of the histogram count circuit 28 and secondly, together with 3 bits derived from a reference source 66, to the input B of the multiplexer 32. As the keyhole flag signal is true, the modified signal, as opposed to the unmodified signal, appears on the output 42 of the multiplexer 32.

In the histogram count circuit 28, the coded data is analysed and stored as a table of the occurrence of each output level within the specified keyhole. One form of the histogram count circuit 28 will be described later with reference to FIG. 3. When the keyhole 22 has been completely scanned, a count signal appears on the line linking the output 46 of the circuit 28 to the input 48 of the recode and control logic circuit 26 which then takes command of the code RAM 24 and the histogram count circuit 28. USing the data stored in the histogram count circuit 28, the recode and logic circuit 26 determines a new encoding strategy which is written by the recode address lines from the output 50 into the multiplexer 30 and by the recode data lines from the output 54 into the code RAM 24. During the next scan of the keyhole the code RAM 24 applies the new coding strategy and the cycle repeats. Once again, as the histogram count circuit 28 completes the counting of the coded data, the circuit 26 determines a new recoding strategy. The iterative determination of the recoding strategy occurs, each time, after the scanning of the keyhole 22 (FIG. 1). Subject to certain considerations which will be explained when describing FIG. 7, satisfactory histogram modification of a scene will be achieved typically after 20 scans and, unless there are any rapid changes in the scene depicted by the keyhole, the system is able to track most scene changes with an imperceptable 1 to 5 frames delay.

Figure 3:
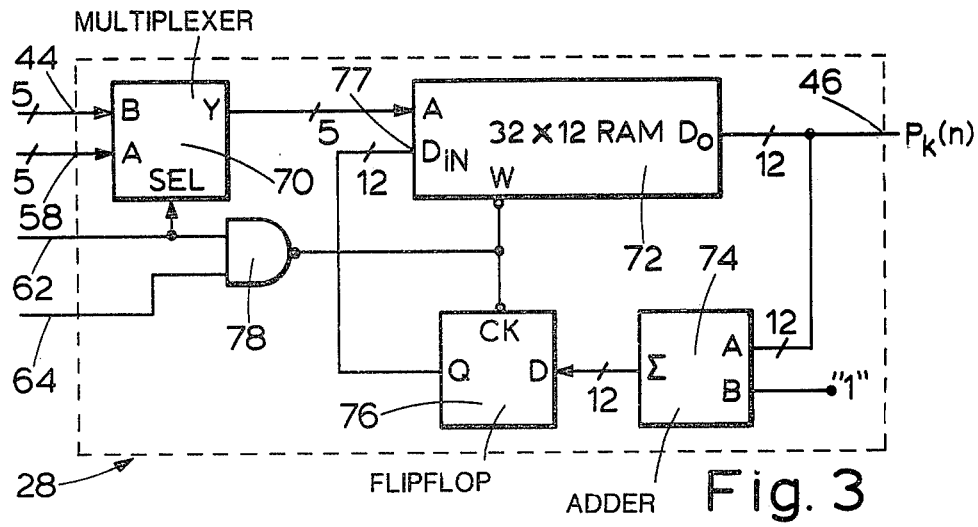
FIG. 3 is a block schematic diagram of the histogram count circuit (block 28), shown in FIG. 2.

FIG. 3. shows in detail the histogram count circuit 28 which counts and stores the histogram of the number of pixels in each output grey level. The circuit 28 comprises a multiplexer 70 having inputs A and B and an output Y which is connected by a 5 way connector to the address input A of a 32×12 count RAM 72. An output $D_o$ of the RAM 72 is connected to the output terminal 46 and to an input A of an adder 74, a second input B of which is connected to a source of a binary "1" signal. A sum output $\Sigma$ of the adder 74 is connected to a latch circuit, which conveniently comprises D-type flip-flops 76 (i.e. one flip-flop per line). The Q outputs of the flip-flops 76 are connected to a 12-way $D_{IN}$ input 77 of the RAM 72. The keyhole flag line 62 and the clock line 64 are connected to respective inputs of a NAND gate 78, whose output is connected to a write input W of the RAM 72 and to the clock input of the flop-flop 76. The line 62 is also connected to a SEL input of the multiplexer 70, of which the input A is connected to the level output 56 of the recode and control logic circuit 26 (FIG. 2) via the input 58, and the input B of which is connected to the input 44 of the circuit 28.

The RAM 72 has provision to store 32 words, one for each of the compressed grey levels, of 12 bits each. The bits of each of these words are used to indicate the sum of occurrences of that word (i.e. grey level) as the keyhole 22 (FIG. 1) is scanned. At each occurrence of a given grey level, i.e. address at input A of the RAM 72, it is necessary to increment the word in that address by "1". This is done by applying the output from the RAM 72 to the input A of the adder 74. As the input B is permanently at binary "1", the adder adds "1" to the 12 bit word and a new sum appears at the output $\Sigma$ of the adder 74. The new sum signal is latched and written into the RAM 72 by the clock input CK of the D type flip-flop 76 and the write input W of the RAM 72 going low, this occuring when the clock line 62 is high.

When the scanning of the keyhole 22 (FIG. 1) is complete, the keyhole flag signal becomes false or low and the level address signal from the circuit 26 (FIG. 2) causes the RAM 72 to read out as desired the total count $P_k(n)$ in the level k being addressed.

Although not shown, means are provided for clearing the RAM 72 at the end of a count/recode cycle.

Figure 4:
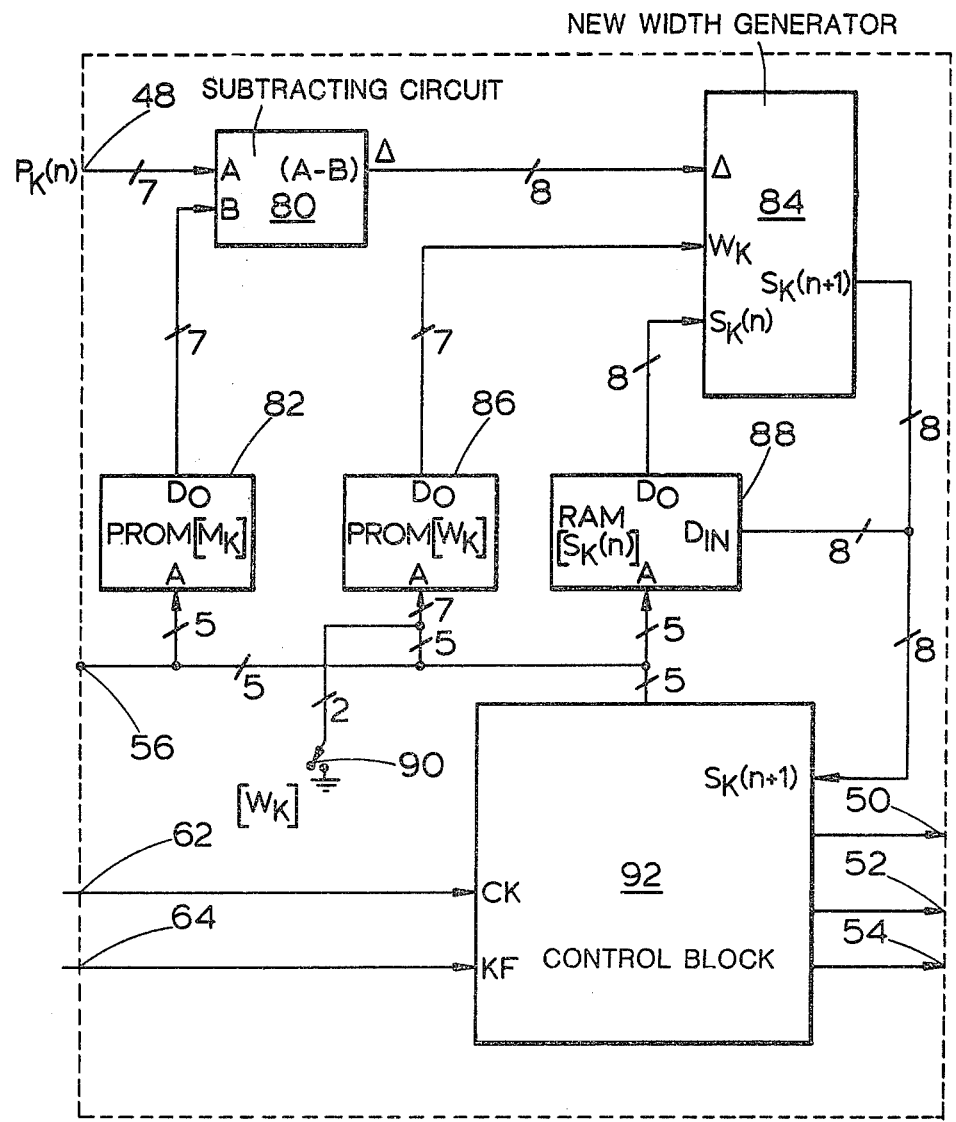
FIG. 4 is a block schematic diagram of the recode, and control logic circuit (block 26) shown in FIG. 2.

FIG. 4 shows in greater detail an embodiment of the recode and control logic circuit 26. In order to facilitate the understanding of the construction of the circuit and its operation, the purpose of the recode and control logic circuit 26 will be given. Essentially a count $P_k(n)$ of a level k in the histogram count circuit 28 is compared with a theoretical ideal population count, $M_k$, and if the difference is within defined limits, termed a window, then the code RAM 24 (FIG. 2) is told that insofar as that level k is concerned, the recoding strategy is satisfactory, alternatively, if the difference is outside the window then, depending on whether the difference is too high or too low, the code RAM 24 is recoded so that at least one less or at least one more of the grey levels in the input video signal are encoded into the level k.

In the embodiment shown in FIG. 4, the count $P_k(n)$ in the selected level of the RAM 72 (FIG. 3) is applied via the input 48 to one input A of a subtracting circuit 80. On the other input B of the subtracting circuit 80 is applied a signal representative of the ideal population, $M_k$, in the level k. The signal $M_k$ is derived from a programmable read only memory (PROM) 82. In the case of histogram equalization, $M_k$ will be a constant value but for other forms of histogram modification the value $M_k$ may vary depending on the address of the level k being considered. A difference signal $\Delta$ representative of $(P_k(n) - M_k)$ is applied to a new width generator 84. Also applied to the generator 84 is a window signal $W_k$ which is derived from a PROM 86 and a signal $s_k(n)$ representative of the number of input video signal levels compressed into the selected level k, which signal is derived from a RAM 88. The size of the window $W_k$ may be fixed but alternatively may be selected manually from a range of sizes, for example 4 sizes, using a switch 90 shown diagrammatically in FIG. 4. In the generator 84, which may include an FPLA (field programmable logic array), the difference signal $\Delta$ is compared with the window $W_k$ and depending on the result a new value $s_k(n+1)$ is stored in the RAM 88 and is also applied as an input to a control block 92 from where it used to recode the next $s_k(n+1)$ words of the code RAM to the level k. As noted above the number $s_k(n+1)$ may be equal to, greater than or lower than $s_k(n)$ depending on the result of the comparison between $s_k(n)$ and $\Delta$ in the generator 84.

As shown in FIG. 4, the clock and keyhole flag lines 62, 64 are connected to the control block 92 which has connections to the outputs 50, 52, 54 and 56.

Although one embodiment of the invention has been described, others may be developed to operate the iterative algorithm which normally converges from a linear coding to the specified, scene-adaptive non-linear coding with a maximum of approximately 20 frames delay and able to track most changes with an imperceptable 1 to 5 frames delay. A flow chart for this algorithm is shown in FIG. 5 and uses the following notation:

n: the number of the current iteration.
p,r: the number of input and output levels respectively.
i,k: index parameters running over the input and output levels respectively i.e. $0 \leq i \leq p-1$; $0 \leq k \leq r-1$.
$M_k$: the theoretical population of the kth output level corresponding to the given keyhole size and chosen distribution. The set of populations $(M_k)$ thus defines the hypothetical ideal distribution towards which the recoding strategy converges.
$s_k(n)$: the number of input levels compressed into output level k at the nth iteration $s_k(n)$ is necessarily $>0$ for all k and n.
$P_k(n)$: the measured population of the kth output level after the nth iteration.
$W_k$: a "window" value for the kth level, giving the tolerance required on the difference between the theoretical population $M_k$, and the measured population $P_k(n)$ for the fit to be deemed satisfactory. Thus, of $|M_k - P_k(n)| < W_k$ for all k in $0 \leq k \leq r-1$, then a satisfactory match has been made between the desired and actual output distributions after the nth iteration. The set of values $(W_k)$ may or may not be independent of k, depending on the required output distribution, and they may also, under certain circumstances, be time dependent, in which case they would be written $W_k(n)$
$\Delta$: the difference between $P_k(n)$ and $M_k$ i.e. $\Delta = P_k(n) - M_k$.
B: is a summation variable used when recoding the code RAM. At any time during the recode cycle B contains the address of the next output value change.

Considering the overall strategy, the start of the algorithm is denoted by a circle reference 100. The first thing to be determined are the start-up factors such as $\{M_k\}$, $\{W_k\}$ and $\{S_k(o)\}$, these being shown collectively by the block 102. Once these factors have been determined the first interrogation of the video input signal can be made using say a linear compression. The block 104 denotes the operation of forming a histogram count (compare with the histogram count circuit 28 in FIG. 2) and obtaining a set $\{P_k(n)\}$ of population figures. The block 106 denotes the operation of using this set of population figures $\{P_k(n)\}$ to determine the new recode strategy that is, $\{S_k(n+1)\}$, (compare with the recode and control logic circuit 26 as described with reference to FIG. 4). The block 108 denotes the operation of recoding the code RAM using $\{S_k(n+1)\}$ and finally the block 110 indicates that the cycle repeats for the next iteration.

Figure 5:
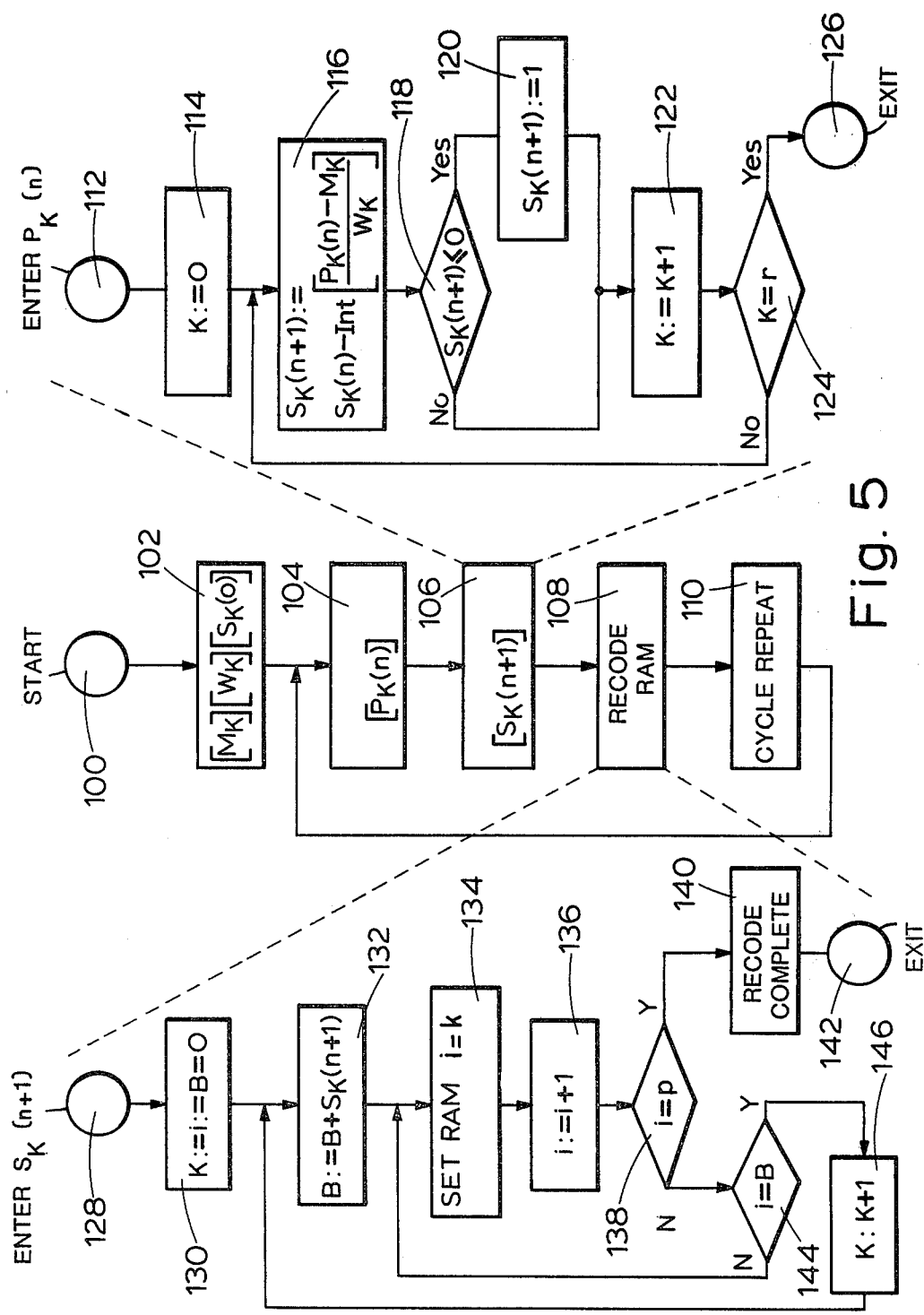
FIG. 5 is a flow chart of an algorithm for iterative histogram modification.

Referring to the expansion of the block 106 on the right hand side of FIG. 5. The set of population figures $P_k(n)$ is entered at the point 112 and the block 114 indicates the start of the sequence beginning at the level k=0 for determining a new set $\{S_k(n+1)\}$ which is carried out and is denoted by the block 116

$$S_k(n+1): = S_k(n) - Int\,[(P_k(n) - M_k)/W_k]$$
$$= S_k(n) - Int\,[\Delta/W_k]$$

where "Int" denotes the integer part of quotient shown in the brackets.

The value of the change in $S_k(n)$, i.e. $[\Delta/W_k,]$ would normally be truncated to a value of say 7 in the present case to reduce hunting. The size of the window, $W_k$ is an important parameter. If $W_k$ is too small, then the system will constantly reassign input levels to different output levels, even when the video signal is unchanging. If $W_k$ is too large, then the final equalised histogram can deviate widely from the ideal rectangular form.

Having determined $S_k(n+1)$ it is necessary to decide if it is less than or equal to zero. This is decided by the decision block 118. If the answer is "yes" then it is necessary to make $S_k(n+1):=1$ because otherwise the output level would contain no pixels this operation is denoted by the block 120. Once this has been done or if the answer from the decision block is "No", it is necessary to select the next higher level so that $k:=k+1$, this is done in the block 122. Finally it is necessary to decide if $k=r$, r being the highest output level. This is done in decision block 124. If the answer is "No" then the cycle through the blocks 116, 118, 120 and 122 is repeated for the next value of k. If the answer is "yes", this is indicated at the exit point 126.

The expansion of the block 108 on the left hand side of FIG. 5 shows an entry point 128 into which $\{S_k(n+1)\}$ is set and the block 130 in which k, i and B are initially made equal to zero. Then it is necessary to make B equal to $B+S_k(n+1)$, block 132, and set the code RAM such that an input video signal input level i is recoded or assigned to a particular output level k, block 134. In the block 136 the input level i is increased by 1 to a new value of i i.e. $i:=i+1$. In order to check if the recoding is complete, it is necessary to decide if the new value i is equal to p which is the number of input levels. This decision is made in the block 138 and if the answer is "yes" then it is necessary to produce a recode complete signal, block 140, which appears on exit point 142.

If the decision at block 138 is "No" then it is necessary to decide if the new value of i is equal to B, block 144. If the answer is "No" an appropriate signal is given to the block 134 and the cycle repeats until $i=B$, however if it is "yes", then the output level k is incremented by 1, block 146, and the new value of k is used to instruct the block 132.

With the algorithm of FIG. 5, using operators such as histogram equalization, hyperbolization and exponentiation, the recoding starts at black and works towards white. However for certain output distributions such as Gaussian, the recoding should be started from the center of the output distribution rather than say the blackest level as would happen by starting at $k=0$ and progressing to $k=r$ in FIG. 5.

The algorithm as described above makes no provision for testing that:

$$\sum_{k=o}^{r-1} S_k = p,$$

each S being varied independently. In practice it has been found that such a check represents unnecessary sophistication.

When using this iterative algorithm, it should be noted that it is necessary to store the values of $S_k$ as well as the histogram count, $p_k$.

The description of the drawings has so far been restricted to image enhancement of a keyhole 22 of a frame 20 (FIG. 1). However by means of sampling techniques, the pixels applied to the count RAM input can be selected randomly or pseudo-randomly from the complete frame. The resulting histogram in the count module would be an approximation to the histogram of the whole image. Accordingly, recoding based on the grey levels in the histogram could then be applied to the whole frame 20.

Figure 6:
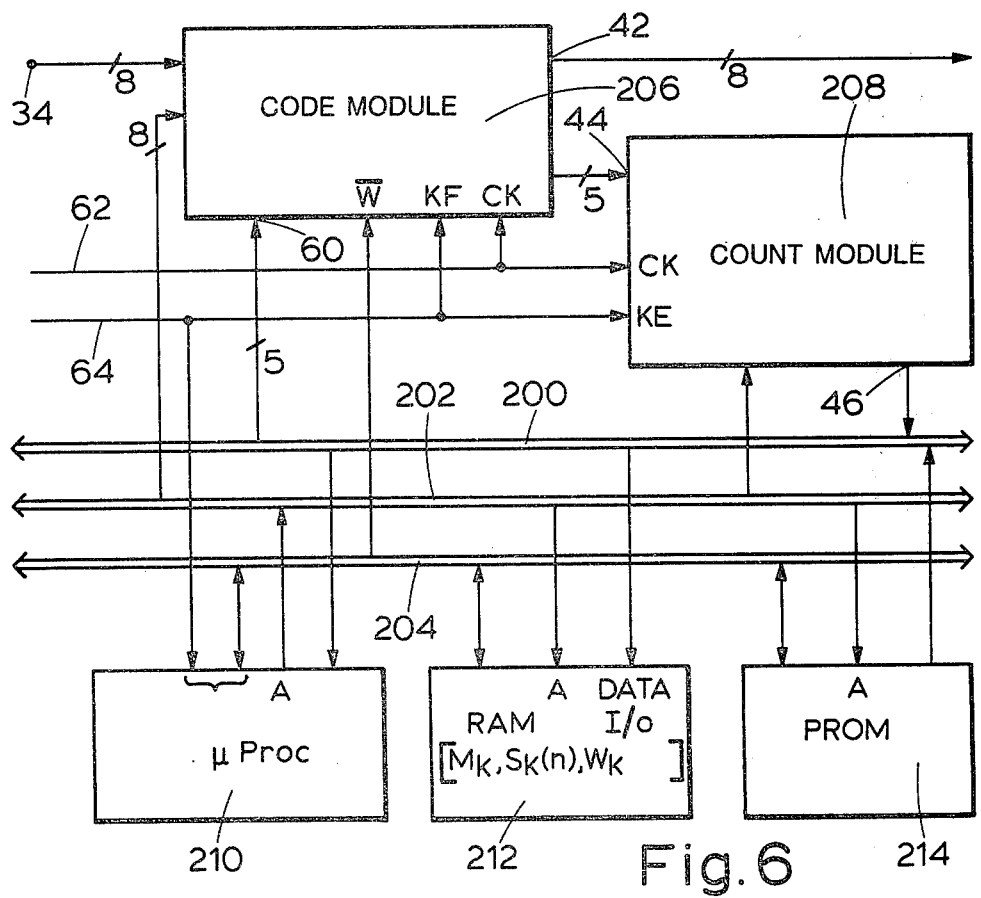
FIG. 6 is a block schematic diagram of an iterative histogram modification system which is controlled by a microprocessor.

FIG. 6 shows schematically an embodiment of an iterative histogram modification system which is controlled using a microprocessor.

The system comprises a data bus 200, an address bus 202, and a control bus 204, to which are connected a code module 206, a count module 208, a microprocessor 210, a main memory 212 comprising a RAM and a program memory 214 comprising a PROM. The code module 206 is effectively a combination of the multiplexers 30 and 32 and the code RAM 24 shown in FIG. 2 and the count module 208 is effectively the histogram count circuit 28 shown in FIG. 3. Accordingly the detailed description of their operation will not be given.

The programming of the microprocessor 210 will be determined by the software stored in the program memory 214. This software will include the general iterative histogram modification algorithm shown in FIG. 5 together with the operators required to obtain the various desired scene enhancements such as equalized hyperbolic, exponential and Gaussian histograms.

In order to cooperate with the microprocessor 210 and the program memory 214, the main memory 212 stores information such as the theoretical population of the kth output level $M_k$, the number of input levels compressed into output level k at the nth iteration, $S_k(n)$, and a window value for the kth level $W_k$.

By using a suitably programmed microprocessor 210, the system of FIG. 6 can be made more flexible and versatile than the system shown in FIGS. 2 to 4.

For example, by using the additional flexibility of the microprocessor 210, the statistics of the output image, represented here by $\{M_k\}$ can be made to be scene dependent, that is various typical input histograms e.g. double humped, mostly black, mostly white can be detected and used to select different "ideal" histograms. The "ideal" histogram could also be modified depending on the presence within the keyhole of objects of a certain shape, e.g. point targets, as indicated by some pattern detection system external to the histogram modification system described here. Furthermore, various forms of image enhancement may benefit from a time and scene dependent choice of the "ideal" histogram, $\{M_k(n)\}$, whose parameters could be made to be a function of both the new image statistics $\{P_k(n+1)\}$ and of the old standard $\{M_k(n)\}$ in an iterative manner.

The use of a microprocessor will enable a time dependent determination of the window factors $\{W_k\}$ to be achieved. This represents an extremely useful extension, since for a given output histogram and keyhole size, the ideal window factors are not uniquely determined as they also depend to some extent on the image statistics. Selection of four different sets of window values was allowed for the manual system shown in FIG. 4, however, the existence of the microprocessor enables a much more sophisticated and scene dependent determination of the optimum set $\{W_k\}$. This would be of use, for example, in increasing the speed of convergence of the algorithm following large perturbations by selection of a set $\{W_k\}$ with a small mean value initially. It will be recalled from FIG. 5 that $s_k(n+1)=\text{Int. }[(P_k(n)-M_k(n))/W_k(n)]$, that is the change in $s_k(n)$ is inversely proportional to $W_k$. Once the system has converged to near optimum, reduced noise performance will be obtained by allowing the average value of the set $\{W_k\}$ to increase, since if for any level k, $W_k$ is too small, recode noise is introduced as input levels are continually added into and subtracted from an output level alternately in an impossible attempt to satisfy the criterion $|P_k(n)-M_k|<W_k$.

A variable area keyhole is easy to implement using a microprocessor thereby allowing a "zoom" facility to be provided. The algorithm parameters $\{M_k\}$ and $\{W_k\}$ are keyhole size dependent and therefore a microprocessor would enable these to be recalculated each time they keyhole area was changed by the operator.

Finally the random selection of scene samples referred to above, used to convert the sub-frame keyhole histogram modification into a pseudo-whole frame operator would be programmable and easily changed using a microprocessor.

We claim:

1. A real time histogram modification system in which a recoding strategy of pixels in a digitized input video signal is determined by processing iteratively the number of pixels in respective grey levels of output picture information using a predetermined scene adaptive quantizer comprising:

means for compressing the number of grey levels in the input video signal into a predetermined number of grey levels in accordance with an encoding strategy;

means, coupled to said compressing means, for counting and storing the number of pixels in the compressed video signal appearing in each of said predetermined number of grey levels;

means, coupled to said counting and storing means, for determining whether each of said counts is within, above or below a range of values, called a window, about each of respective predetermined theoretical values, which theoretical values collectively form said scene adaptive quantizer; and means for generating said encoding strategy and for recoding said strategy, when any of said counts are above or below said respective window, by adjusting the number of input grey levels for the respective output grey level.

2. A system as claimed in claim 1, comprising means for forming a pre-positionable keyhole in a frame of the scene to be modified and wherein only the input video signal occurring within the keyhole is subjected to recoding.

3. A system as claimed in claim 1, in which histogram modification is applied to the information in the entire frame and means are provided for selecting a subset of pixels in the output picture information, which subset of pixels are processed iteratively using the predetermined scene adaptive operator to provide the recoding strategy which is applied to all the pixels in the input video signal.

4. A system as claimed in claim 1, 2, or 3, further comprising means for forming a plurality of different size windows.

5. A system as claimed in claim 1, 2 or 3, in which the scene adaptive quantizer is hyperbolic.

6. A system as claimed in claim 1, 2 or 3, in which the scene adaptive quantizer is exponential.

7. A system as claimed in claim 4, in which the encoding strategy generating and encoding means comprises a microprocessor and a program memory for storing at least one scene adaptive quantizer.

8. A system as claimed in claim 7, in which the program memory stores a plurality of non-linear scene adaptive quantizers and the microprocessor is adapted to select and apply any one of the scene adaptive quantizers at will.

9. A system as claimed in claim 7, in which the microprocessor is programmed to vary the size of an area of a frame to be modified and to recalculate the size of the window and the set of predetermined theoretical values, both of which are area dependent variables.

10. A system as claimed in claim 7, further comprising a store containing at least two sets of window values, and wherein the microprocessor is adapted to select one of said sets on a time dependent basis.

11. A system as claimed in claim 7, further comprising a pattern detecting means for modifying a histogram in a scene dependent manner.

12. A system as claimed in claim 1, 2 or 3, in which the encoding strategy generating and recoding means produces a linear encoding strategy for the first frame of the input video signal, the second and susequent frames being recoded using the scene adaptive quantizer.

13. A system as claimed in claim 1, 2 or 3, in which the scene adaptive quantizer is histogram equalization in which each of the predetermined theoretical values is the quotient of the total number of pixels divided by the number of grey levels in the output signal.

14. A system as claimed in claim 1, 2 or 3 in which the scene adaptive quantizer is Gaussian and in which the encoding strategy generating and recoding means is adapted to determine the recoding strategy by starting at the grey levels in the center of the histogram formed in the counting and storing means and working outwards to the black and white levels, respectively.

* * * * *